US005106139A

United States Patent [19]

Palmer et al.

[11] Patent Number: 5,106,139

[45] Date of Patent: Apr. 21, 1992

[54] HAND-HELD PICK-UP DEVICE

[76] Inventors: Harold D. Palmer, 970 Pulpit Rock Cir. N., Colorado Springs, Colo. 80918; Daren D. Palmer, 8065 Essington Dr., Colorado Springs, Colo. 80920; Thomas P. Mealey, 8 Woodsorrel, Pueblo, Colo. 81001

[21] Appl. No.: 553,855

[22] Filed: Jul. 16, 1990

Related U.S. Application Data

[63] Continuation-in-part of Ser. No. 343,608, Apr. 27, 1989, abandoned.

[51] Int. Cl.[5] .......................... B66C 1/02; B23P 19/04

[52] U.S. Cl. .................................... 294/64.1; 29/743; 29/758

[58] Field of Search ...................... 294/64.1, 64.3, 1.2, 294/902; 29/743, 758; 271/208

[56] References Cited

U.S. PATENT DOCUMENTS

| | | | |
|---|---|---|---|
| 2,384,334 | 9/1945 | Olson | 294/64.1 |
| 3,791,689 | 2/1974 | Boone et al. | 294/1.2 |
| 3,879,076 | 4/1975 | Barnett | 294/1.2 |
| 4,164,099 | 8/1979 | Grant | 294/1.2 X |
| 4,172,317 | 10/1979 | Kober et al. | 29/758 X |
| 4,744,594 | 5/1988 | Poli et al. | 294/64.1 |
| 4,822,278 | 4/1989 | Oliva et al. | 294/64.1 X |
| 4,823,942 | 4/1989 | Martin et al. | 271/208 X |

FOREIGN PATENT DOCUMENTS

| | | | |
|---|---|---|---|
| 197808 | 8/1978 | France | 294/1.2 |

OTHER PUBLICATIONS

Research Disclosure Bulletin #128, dated Dec., 1974.

*Primary Examiner*—Margaret A. Focarino
*Assistant Examiner*—Dean J. Kramer
*Attorney, Agent, or Firm*—Linda Flewellen Gould

[57] ABSTRACT

Light-weight items or components may be picked-up and moved from space restricted areas. The method of lifting and placing such items involves the use of a hand-held tool, comprising a hollow tube containing a suction creating device, which suction creating device may be engaged by pressing an actuator member located in a hole in the hollow tube. A tip is attached to an open end of the hollow tube, so that air is expelled from and drawn into the suction creating device in the hollow tube through the tip. A gripping member is removably attached to the tip. The gripping member comprises a suction cup, an extension tube, and a fitting by which the gripping member is attached to the tip. A variety of gripping members, with suction cups of varying sizes and extension tubes of differing angles, may be used with the pick-up device. After expelling air from the suction creating device by use of the actuator member, the pick-up tool is lowered onto the item to be picked up, so that the suction cup comes into contact with that item. The actuator member is then disengaged to allow air to be drawn into the suction creating device, causing the item to be held against the suction cup. In this way, the item may be moved to another location, and released by depressing the actuator member.

16 Claims, 1 Drawing Sheet

54
44
12
18
20
52
10
26
16
30
36
40
42
28
38
50

54
44
52
18
12
24
20
10
26
36
16
30
46
36
32
40
14
34
28
42
38
50

54
44
18
24
12
20
10
52
16
26
30
46
36
32
40
14
28
34
42
38
50

HAND-HELD PICK-UP DEVICE

REFERENCE TO RELATED APPLICATIONS

This is a continuation-in-part of U.S. application Ser. No. 07/343,608 filed Apr. 27, 1989, now abandoned.

BACKGROUND OF THE INVENTION

1. Technical Field

This invention pertains to grasping and moving light-weight items. In many industries, processes, and hobbies, small components or items must be moved from one place to another, in areas with space restrictions making it difficult to properly lift and place the item with a human hand. In these situations, it would be particularly useful to have a hand-held tool which is less bulky than a human hand, which is vacuum activated to pickup and move light-weight items.

An area in which such a hand-held pick-up tool may prove particularly useful is the placement of electronic components, such as integrated circuit chips and chip resistors, onto mounting boards, during assembly or rework operations. The same device may be used to remove such components from space restricted areas to enable close visual inspection. Similarly, small components used in various hobbies, and automotive parts being installed in a confined area, may be easily grasped and moved by a process utilizing such a hand-held pick-up tool.

2. Background Art

Certain tools are known which use suction to move lightweight items in space restricted areas. For example, a vacuum pencil is described in U.S. Pat. No. 3,337,897 to Lerner, et al. This device utilizes a tube enclosed plunger to create a vacuum to aspirate excess solder and small work parts into the tube for removal. The usefulness of this device is limited to the removal of components small enough to fit into the tip of the slender tube. Release of the component is accomplished by removing the tip of the tube, or by releasing the plunger to push the component through the opening in the tube.

A device described in U.S. Pat. No. 4,527,327 to Van Deuren grasps light-weight items through the use of both a plunger to create suction and a pair of jaws. The dual grasping mechanism is quite complex. Like the Lerner device, the size of the component to be picked-up is limited by the mechanical construction of the Van Deuren tool, since the component must be small enough to fit between the jaws.

Other manually operated suction devices are known in the prior art. In U.S. Pat. No. 3,618,846 to Poli, a tool is described for removing excess molten solder. Solder may be pulled into the this tool by manually compressing a bellows, which draws air and near-by solder into the tool as the bellows is allowed to expand. Although this device is useful for picking-up solder, it could not be used to grasp items larger than the tool's opening, as no means is provided to restrict inward air flow to create a vacuum to capture a surface of a component.

Some devices designed for the removal and application of contact lens utilize a vacuum to secure and move the lens. Thus, U.S. Pat. Nos. 3,424,486 to Corley, 4,071,272 to Drdlik, 4,123,098 to Shoup, and 4,079,976 to Rainin, et. al describe various apparati expressly devised to remove or install contact lens. These devices are uniquely suited to grasping a lens of the weight, shape, and material of a contact lens, but are not designed to take advantage of a person's manual dexterity for fine positioning of light-weight items. Furthermore, these devices are not intended for use in space restricted areas, as they are designed to allow placement of the tool carried lens onto the user's eye.

Of course, suction may be used in other contexts, for picking up liquids or heavy items. Thus, U.S. Pat. No. 2,752,199 to Newell describes a squeeze bottle which may be used to dispense predetermined amounts of liquids by squeezing the resilient container. U.S. Pat. No. 4,021,068 to Piazza discloses a device which utilizes suction to pick-up golf balls. Although each of these devices is effective for its intended purpose, they are not useful for picking-up light-weight components. The Newell squeeze bottle provides no grasping mechanism, as it is designed for dispensing. The Piazza retriever is too bulky to be used for small or fragile components.

Of those devices known in the prior art for moving light-weight items such as electronic components and hobby parts, each is mechanically limited as to the size of the item to be moved, either by restrictions in the size of an opening through which the item is to be pulled, or by the complexities of mechanical grasping mechanisms. A hand-held device is needed, which is thin enough to be used in space restricted areas, and which can reach and grasp light-weight items of a variety of sizes and shapes.

DISCLOSURE OF THE INVENTION

Summary of the Invention

An object of this invention is to provide a simple, inexpensive process for moving light-weight components within space restricted areas.

Another object of this invention is to provide a simple, hand-held and manually operated tool to pick-up and move light-weight items of a variety of sizes and shapes.

Yet another object of this invention is to provide a vacuum activated pick-up tool which is small and portable, and is not encumbered by an exterior vacuum line and vacuum source.

The tool utilized in this method of picking up light-weight items is similar in size, rigidity, and exterior shape to a fountain pen. Because the tool is held and operated with motions similar to those used in writing with a pen or pencil, the tool utilizes common dexterity of the thumb and fore-finger to move objects. Thus, the tool is simply and easily grasped and operated to allow convenient and precise positioning of light-weight items.

An elongated, hollow tube serves to house a suction creating device. Ideally, the suction creating device is a pliable bulb, which may be squeezed against the interior of the hollow tube by applying pressure to an actuator member. The actuator member extends through a hole in the hollow tube, so that an interior segment of the actuator member resides in the interior of the hollow tube, while an exterior segment resides exterior of the hollow tube, when the actuator is not engaged.

A tip member tightly surrounds the open end of the pliable bulb, so that all air entering the pliable bulb flows through the tip member. The tip member also has a tube engaging section which is of a diameter which fits tightly onto one open end of the hollow tube.

At the end of the tip member which is opposite the pliable bulb, the tip member decreases in external diameter to form a male fitting which is mated with a gripping member. This gripping member has three primary elements. A female fitting may be removably and snugly fit onto the tip member. Extending from that female fitting is an extension tube, which may be straight or angled. A suction cup suitable in size to engage the item to be picked-up is attached to the opposite end of that extension tube. Ideally, a variety of gripping members may be utilized with each pick-up tool, each with a different angle of the extension tube or a different size suction cup, and each of which may be removably fitted onto the tip member.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

DETAILED DESCRIPTION OF THE PREFERRED EMBODIMENT

Figures 1, 2, 3:
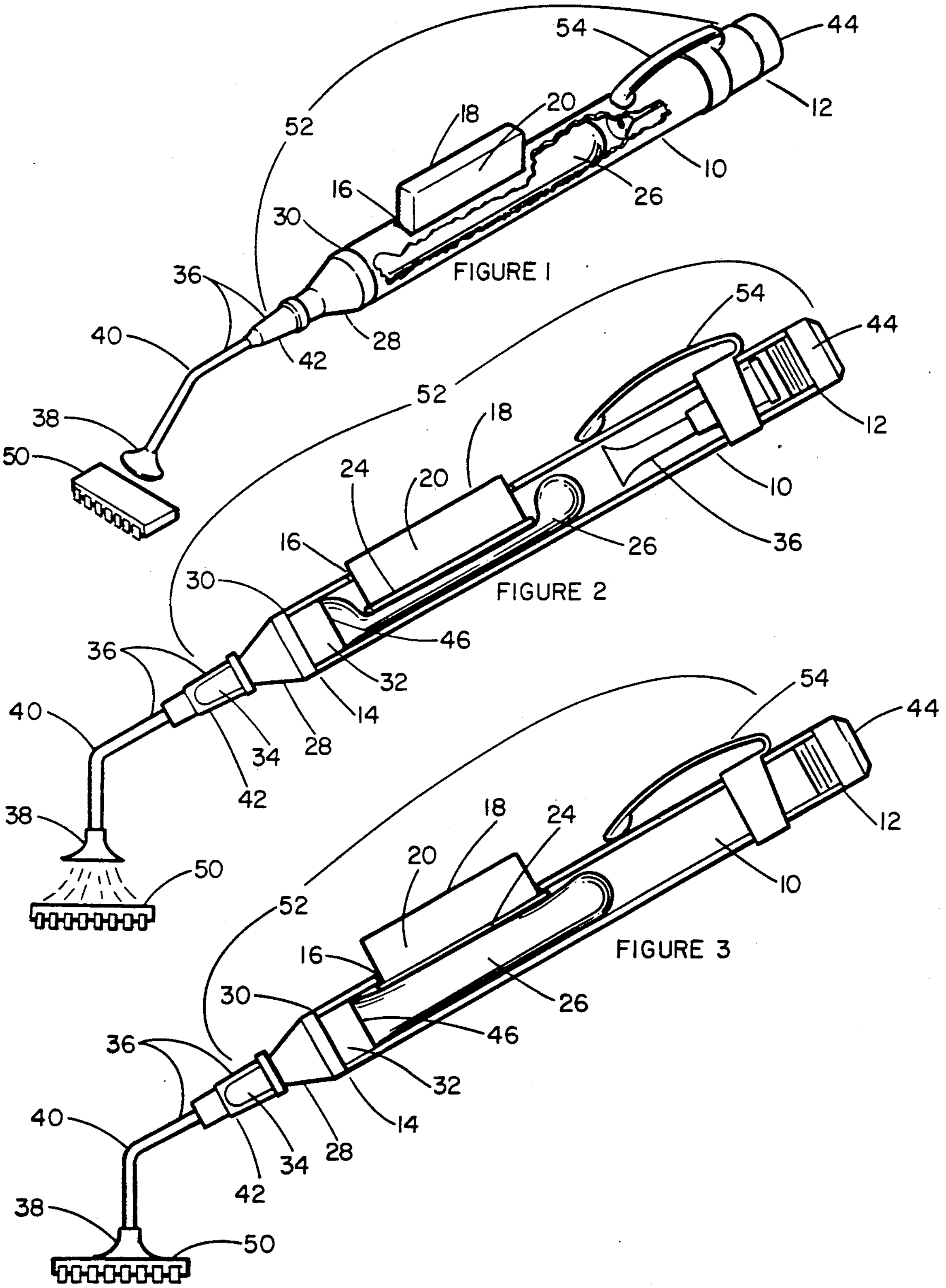
FIG. 1 is a perspective view of a tool being placed on an item for the purpose of lifting that item with the tool, using the method described herein, with a portion of the tool cut-away to reveal certain interior components.
FIG. 2 is a side view of a tool which can be utilized to pick-up a light-weight item, with certain interior components revealed, in which an actuator member has been engaged.
FIG. 3 is a side view of a tool which can be utilized to pick-up a light-weight item, with certain interior components revealed, in which an actuator member has been disengaged.

The features of the manual pick-up technique according to the present invention can be better understood by reference to FIG. 1. As is shown in FIG. 1, a pick-up tool 52 comprises an elongated, hollow tube 10 enclosing a suction creating means 26. A vacuum may be created in said suction creating means 26 by application of pressure to an actuator member 18, as better shown in FIG. 2. When the actuator member 18 is disengaged, as shown in FIG. 3, air is drawn into the suction creating means 26 through a tip member 28. Attached to the tip member 28 is a gripping member 36. When the gripping member 36 is placed in contact with the item 50 to be picked-up, and air is drawn into the suction creating means 26 through the gripping member 36 and the tip member 28 as a result of releasing pressure previously applied to the actuator member 18, the item 50 is held tightly against the gripping member 36, and may be moved by movement of the hollow tube 10.

The item 50 to be picked up may be located in a space restricted area, so that it is difficult or impossible to reach the item 50 with a human hand. The slender shape of the pick-up tool 52 enables the user to manually place the pick-up tool 52 into such a restricted area, to engage and lift the item 50.

The elongated, hollow tube 10 has an open proximal end 14 and a distal end 12. The suction creating means 26 is situated so that air may be drawn into or pushed out of the suction creating means 26 through an open end 46 of that suction creating means 26 in conjunction with the proximal end 14 of the hollow tube 10. The suction creating means 26 may advantageously comprise a pliable bulb.

The actuator member 18 extends through a hole 16 formed in the hollow tube 10. The actuator member 18 comprises two segments: an interior segment 24 residing inside the hollow tube 10, and an exterior segment 20 which resides outside the hollow tube 10 when no pressure is applied to the actuator member 18. However, when pressure is applied to the actuator member 18, as is shown in FIG. 2, the exterior segment 20 is pushed through the hole 16 into the interior of the hollow tube 10, causing the suction creating means 26 to be squeezed against the interior of the hollow tube 10, and thus causing air to be expelled from the suction creating means 26. As is shown in FIG. 3, the actuator member 18 may be disengaged by releasing pressure previously applied to the exterior segment 20. When this happens, the suction creating means 26 expands to resume its original shape, thus drawing air into the suction creating means 26 through the open end 46. The interior segment 24 may be prevented from moving through the hole 16 by making the interior segment 24 larger than the hole 16. The exterior segment 20 is smaller than the hole 16, however, to facilitate the movement of the actuator member 18 into the interior of the hollow tube 10, to squeeze the suction creating means 26.

The tip member 28 comprises a hollow shaft of varying diameters. The tube engaging section 30 of said hollow shaft fits tightly against the proximal end 14 of the hollow tube 10. Extending into the interior of the hollow tube 10 from the tube engaging section 30 is a suction means fitting end 32 of the tip member 28. The suction means fitting end 32 has an internal diameter which snugly fits onto the open end 46 of the suction creating means 26. At the opposite end of the tip member 28, a gripping member fitting end 34 has a decreasing external diameter suitable for engaging the gripping member 36.

The suction means fitting end 32 of the tip member 28 may be designed to tightly fit onto the open end 46 of the suction creating means 26, without additional securing mechanisms. Alternatively, the suction means fitting end 32 may be glued or otherwise secured to the open end 46. One advantageous securing device is the use of a sealing plug (not shown), which fits snugly into the open end 46, causing the open end 46 to expand to tightly fit against the interior of the suction means fitting end 32, and containing a hole through which air may be pulled between the tip member 28 and the suction creating means 26.

The gripping member 36 comprises three primary elements. A female fitting 42 may be removably and snugly fit onto the gripping member fitting end 34 of the tip member 28. Extending from that female fitting 42 is an extension tube 40, which may be straight or angled. A suction cup 38 suitable in size to engage the item 50 to be picked-up is attached to the opposite end of that extension tube 40. Ideally, a variety of gripping members 36 may be utilized with each pick-up tool 52, each with a different angle of the extension tube 40 or a different size suction cup 38, and each of which may be removably fitted onto the tip member 28.

Alternative gripping members 36 may be conveniently housed in the distal end 12 of the hollow tube 10, by placing a removable plug 44 into the distal end 12, as shown in FIG. 2.

The pick-up tool 52 may be conveniently attached to a shirt pocket by placing a pocket hook 54 onto the exterior of the hollow tube 10.

The pick-up tool 52 may be advantageously used in the process of picking-up and moving a light-weight item 50, possibly located in a space restricted area. Air is expelled from the suction creating means 26 by applying pressure to the actuator member 18. The pick-up device 52 is then placed in close proximity to the item 50 to be picked-up, so that the suction cup 38 is held against the item 50. The actuator member 18 is then disengaged, so that air attempts to move into the suction creating means 26 through the gripping member 36 and the tip member 28. The item 50 is then held against the suction cup 38, allowing the item 50 to be moved to a desired location by manual movement of the hollow tube 10. Once the item 50 has been moved to the desired location, the item 50 may be released by applying pressure to the actuator member 18, causing air to be expelled from the suction creating means 26, and thus releasing the item 50 from the suction cup 38.

When the pick-up tool 52 is used to pick-up a light-weight item 50 comprising an electronic component, it is particularly important that no electric charge be created or emitted which might damage the electronic component. To avoid injury to the electronic component 50 being moved, each element of the pick-up tool 52 is most advantageously made of conductive materials. Electrostatic discharge can be even more effectively prevented by forming the suction cup 38, the gripping member 36, or other elements of the pick-up tool 52, from static dissipative materials.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

We claim:

1. A hand held tool for picking-up electronic components, comprising:

(a.) an elongated, hollow tube, having an open proximal end and a distal end, having a hole formed therein through which an actuator member extends from the exterior to the interior of said hollow tube, (b.) suction creating means located inside said hollow tube, in such a manner that air is expelled from said suction creating means by application of pressure to said actuator member, said suction creating means further comprising a pliable bulb having one end open to an internal cavity, (c.) tip member, having a tube engaging section which is of a diameter which fits tightly onto the open proximal end of the hollow tube, having a suction means fitting and snugly connected to said open end of said pliable bulb in such a manner that when said pliable bulb expands, air is drawn into said pliable bulb through said tip member, and having a gripping member fitting end, (d.) a sealing plug with a hole formed therein, fit into said open end of said pliable bulb, causing said open end to be expanded to fit tightly against said suction means fitting end of said tip member, said sealing plug being separable from said tip member, and (e.) gripping member for placing in contact with the electronic component to be picked-up, removably and snugly attached to said gripping member fitting end of the tip member, through which air is drawn into the tip member when the suction creating means expands, causing the electronic component to be held against the gripping member, wherein the gripping member is formed from electrically conductive materials.

2. A hand held tool for picking-up electronic components as described in claim 1, wherein said tip member further comprises:

an elongated, hollow shaft of varying diameters, the suction means fitting end of said shaft having an internal diameter which snugly fits onto said open end of said pliable bulb, the tube engaging section of said shaft having an external diameter which snugly fits the open proximal end of said hollow tube, and the gripping member fitting end having a decreasing external diameter suitable for engaging the gripping member.

3. A hand held tool for picking-up light-weight items as described in claim 1, where said gripping member further comprises:

a suction cup suitable for placing in contact with an item to be picked-up, a hollow extension tube extending from said suction cup, and a hollow tip fitting member attached to the opposite end of said extension tube, which tip fitting member removably and snugly fits onto the gripping member fitting end of the tip member.

4. A hand held tool for picking-up light-weight items as described in claim 3, wherein said extension tube is angled to enable the hollow tube to be held at an angle with respect to said suction cup.

5. A hand held tool for picking-up electronic components as described in claim 3, wherein said suction cup is formed from electrically conductive materials.

6. A hand held tool for picking-up electronic components as described in claim 3, wherein said suction cup is formed from static electricity dissipative materials.

7. A hand held tool for picking-up light-weight items as described in claim 1, wherein the distal end of the hollow tube is enclosed by a removable plug.

8. A hand held tool for picking-up light-weight items as described in claim 1, wherein said actuator member has an exterior segment which resides on the exterior of the hollow tube when the actuator member is not engaged, which exterior segment is sufficiently narrow to be moved through the hole formed in the hollow tube by application of pressure to said exterior segment.

9. A hand held tool for picking-up light-weight items as described in claim wherein said actuator member has an interior segment which resides on the interior of the hollow tube, said interior segment being shaped so that said interior segment cannot move through the hole formed in the hollow tube to the exterior of the hollow tube, said interior segment being located with respect to the suction creating means so that application of pressure to the actuator member causes said interior segment to press the suction creating means against the interior of the hollow tube, expelling air from the suction creating means.

10. A hand held tool for picking-up light-weight items as described in claim further comprising a pocket attaching device connected to the exterior of the hollow tube in such a manner that the hollow tube may be securely held against a pocket of clothing.

11. A hand held tool for picking-up electronic components as described in claim 1, wherein said tip are formed from electrically conductive materials.

12. A hand held tool for picking-up electronic components as described in claim 1, wherein said pliable bulb is formed from electrically conductive materials.

13. A hand held tool for picking-up electronic components as described in claim 1, wherein said pliable bulb is formed from static electricity dissipative materials.

14. A hand held tool for picking-up electronic components comprising:

(a.) an elongated, hollow tube, having an open proximal end and a distal end, having a hole formed therein through which an actuator member extends from the exterior to the interior of said hollow tube, (b.) suction creating means located inside said hollow tube, in such a manner that air is expelled from said suction creating means by application of pressure to said actuator member, said suction creating means further comprising a pliable bulb having one end open to an internal cavity, (c.) tip member, having a tube engaging section which is of a diameter which fits tightly onto the open proximal end of the hollow tube, having a suction means fitting and snugly connected to said open end of said pliable bulb in such a manner that when said pliable bulb expands, air is drawn into said suction creating means through said tip member, and having a gripping member fitting end, (d.) a sealing plug with a hole formed therein, fit into said open end of said pliable bulb, causing said open end to be expanded to fit tightly against said suction means fitting end of said tip member, said sealing plug being separable from said tip member, and (e.) gripping member for placing in contact with the electronic component to be picked-up, removably and snugly attached to said gripping member fitting end of the tip member, through which air is drawn into the tip member when the suction creating means expands, causing the electronic component to be held against the gripping member, wherein the gripping member is formed from static electricity dissipative materials.

15. A hand held tool for picking-up electronic components as described in claim 14, wherein said tip member and said hollow tube are formed from electrically conductive materials.

16. A hand held tool for picking-up electronic components as described in claim 14, wherein said tip member and said hollow tube are formed from static electricity dissipative materials.

* * * * *